(12) United States Patent
Tagashira et al.

(10) Patent No.: US 10,144,994 B2
(45) Date of Patent: *Dec. 4, 2018

(54) COLD-ROLLED STEEL PLATE AND METHOD OF MANUFACTURING THE SAME

(71) Applicant: Nisshin Steel Co., Ltd., Chiyoda-ku, Tokyo (JP)

(72) Inventors: Satoshi Tagashira, Kure (JP); Masahito Suzuki, Kure (JP); Tomohiro Imanaka, Kure (JP)

(73) Assignee: Nisshin Steel Co., Ltd., Tokyo (JP)

( * ) Notice: Subject to any disclaimer, the term of this patent is extended or adjusted under 35 U.S.C. 154(b) by 163 days.

This patent is subject to a terminal disclaimer.

(21) Appl. No.: 14/764,645

(22) PCT Filed: Jan. 23, 2014

(86) PCT No.: PCT/JP2014/051354
§ 371 (c)(1),
(2) Date: Jul. 30, 2015

(87) PCT Pub. No.: WO2014/119460
PCT Pub. Date: Aug. 7, 2014

(65) Prior Publication Data
US 2015/0368764 A1 Dec. 24, 2015

(30) Foreign Application Priority Data

Jan. 31, 2013 (JP) .................................. 2013-016754
Oct. 25, 2013 (JP) .................................. 2013-222745

(51) Int. Cl.
| | | |
|---|---|---|
| *C22C 38/28* | (2006.01) | |
| *C21D 8/02* | (2006.01) | |
| *C21D 9/46* | (2006.01) | |
| *C22C 38/14* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *B21B 1/22* | (2006.01) | |
| *B21B 45/00* | (2006.01) | |
| *C22C 38/00* | (2006.01) | |
| *C22C 38/08* | (2006.01) | |
| *C22C 38/26* | (2006.01) | |

(52) U.S. Cl.
CPC .................. *C22C 38/28* (2013.01); *B21B 1/22* (2013.01); *B21B 45/004* (2013.01); *C21D 8/02* (2013.01); *C21D 8/0236* (2013.01); *C21D 8/0273* (2013.01); *C21D 9/46* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/26* (2013.01); *C21D 2211/004* (2013.01); *C21D 2211/005* (2013.01)

(58) Field of Classification Search
CPC ......... C22C 38/28; C22C 38/26; C22C 38/14; C22C 38/12; C22C 38/08
See application file for complete search history.

(56) References Cited

U.S. PATENT DOCUMENTS

| | | |
|---|---|---|
| 5,578,143 A | 11/1996 | Koyama et al. |
| 7,749,338 B2 | 7/2010 | Yokoi et al. |
| 2001/0001049 A1 | 5/2001 | Higo et al. |
| 2003/0106622 A1 | 6/2003 | Matsuoka et al. |
| 2005/0106411 A1* | 5/2005 | Ishikawa et al. ............. 428/683 |
| 2006/0081312 A1 | 4/2006 | Yokoi et al. |

FOREIGN PATENT DOCUMENTS

| | | |
|---|---|---|
| CN | 1111458 A | 11/1995 |
| EP | 0475096 A1 | 3/1992 |
| EP | 1143022 A1 | 10/2001 |
| EP | 1577412 A1 | 9/2005 |
| JP | 2001073073 A | 3/2001 |
| JP | 2002363693 A | 12/2002 |
| JP | 2003277883 A | 10/2003 |
| JP | 2004162153 A | 6/2004 |

(Continued)

OTHER PUBLICATIONS

European Extended Search Report dated Jul. 28, 2016, issued in the corresponding European Patent Application No. 14746915.9.
Chinese Office Action dated Jun. 2, 2016 for the corresponding Chinese Patent Application No. 201480006392.0.
Office Action dated Sep. 13, 2017 during the prosecution of corresponding U.S. Appl. No. 15/496,192.
Office Communication dated Jul. 17, 2017, issued in the corresponding European Patent Application No. 14746915.9.

*Primary Examiner* — Edward M Johnson
(74) *Attorney, Agent, or Firm* — Troutman Sanders LLP

(57) ABSTRACT

A cold-rolled steel plate having favorable heat spot resistance, favorable antiwear performance, and favorable punching performance is provided.

The cold-rolled steel plate has a chemical composition containing, on the basis of percent by mass, C from 0.03 to 0.08%, Si from 0 to 1.0%, Mn from 0.2 to 0.8%, P at 0.03% or less, S at 0.01% or less, and Al at 0.05% or less so as to satisfy the following relationship: 5*C %–Si %+Mn %–1.5*Al %<1. The chemical composition further contains, on the basis of percent by mass, at least one of Nb from 0.03 to 0.4%, V from 0.01 to 0.3%, and Ti from 0.01 to 0.3% so as to satisfy the following relationship: 0.04<(Nb %/1.4)+(V %/1.1)+Ti %<0.3. An average diameter of particles of a carbide as a precipitate is from 20 to 100 nm. A second phase structure having a longitudinal diameter of 5 μm or more has an area fraction of 5% or less in a cross-sectional structure.

7 Claims, 1 Drawing Sheet

(56) References Cited

FOREIGN PATENT DOCUMENTS

| | | | |
|---|---|---|---|
| JP | 2005089853 | A | 4/2005 |
| JP | 2005249050 | A | 9/2005 |
| JP | 2005249051 | A | 9/2005 |
| JP | 2005249106 | A | 9/2005 |
| JP | 2007211260 | A | 8/2007 |
| JP | 2008266731 | A | 11/2008 |
| JP | 2010132983 | A | 6/2010 |
| JP | 2011001604 | A | 1/2011 |
| JP | 2012180547 | A | 9/2012 |
| JP | 2013227656 | A | 11/2013 |
| WO | 2004/059021 | A1 | 7/2004 |

\* cited by examiner

COLD-ROLLED STEEL PLATE AND METHOD OF MANUFACTURING THE SAME

CROSS REFERENCE TO RELATED APPLICATIONS

The present application is the U.S. National Phase of International Patent Application Serial No. PCT/JP2014/051354, filed Jan. 23, 2014, which claims priority to Japanese Patent Application No. 2013-016754, filed Jan. 31, 2013, and Japanese Patent Application No. 2013-222745 Oct. 25, 2013. The contents of the foregoing applications are hereby incorporated by reference in their entireties.

TECHNICAL FIELD

This invention relates to a cold-rolled steel plate used for example as a clutch plate, and a method of manufacturing the same.

BACKGROUND ART

A multiplate wet clutch for an automatic transmission has an alternate arrangement of multiple friction plates each with a friction material made of a special sheet of paper attached to a surface thereof and separator plates to contact the friction plates. Action of making a switch between separating and connecting the friction plates and the separator plates controls transmission of power.

The friction plate and the separator plate are both ring-shaped steel plate members. Generally, such a friction plate and a separator plate forming the multiplate wet clutch are collectively called a clutch plate.

The following four phenomena are known as major defect phenomena occurring in the separator plate: wear of a spline part (hereinafter called feature A); a rattle due to an inaccurate position of the spline part (hereinafter called feature B); change in roughness due to wear of a surface in friction with the friction plate (hereinafter called feature C); and the occurrence of a heat spot and nonuniformity of a shape and a material quality due to the heat spot (hereinafter called feature D). All of these phenomena are significant characteristics, among which a defect due to the heat spot is the hardest to deal with.

In response to behavior of the multiplate wet clutch to make a shift from a neutral state to a power transmission state to engage the clutch, the friction plate and the separator plate are pressed against each other under high load and a high relative velocity. This rapidly reduces the relative velocity between the friction plate and the separator plate. Resultant frictional heat rapidly enters a surface of the separator plate to become a sliding portion, thereby increasing the temperature of the surface of the separator plate. This temperature increase in the surface of the separator plate becomes a cause for the occurrence of a heat spot.

A projection at the heat spot part resulting from heating with the frictional heat, distortion occurring around the heat spot, and local change in a material quality cause a nonuniform frictional state when the clutch is actuated. The nonuniform frictional state causes a new heat spot. Such a vicious cycle degrades the performance of the multiplate wet clutch to a large extent.

Enhancing fuel efficiency of automobiles is an extremely important problem to be solved at the present time. Enhancing efficiency in terms of a mechanistic aspect and reducing the size and weight of the clutch as a unit are very important elements among various elements forming an automobile.

Requirements for a transmission include enhancement of efficiency, reduction in friction loss, and reduction in size and weight. The efficiency of the multiplate wet clutch should be enhanced to satisfy these requirements. The efficiency of the multiplate wet clutch may be enhanced for example by reduction in the diameter of a plate, reduction in the number of plates, and increase in a coefficient of friction achieved by reducing a lubricant and changing a friction material. However, all of these become causes for excessive temperature increase, specifically, a heat spot that cannot be handled with a conventional technique.

Enhancing the performance of the clutch plate in terms of its material may lead to dramatic enhancement of the efficiency of the transmission. Thus, enhancing heat spot resistance is required for a steel plate to be used as the clutch plate.

Methods described, for example, in PTLs 1 to 5 are known as techniques relating to enhancement of the heat spot resistance of a steel plate.

According to the method described in PTL 1, temperature of phase transformation from ferrite to austenite is increased using low-carbon steel. This prevents the occurrence of phase transformation even if a plate is heated by frictional heat during engagement of a clutch, thereby suppressing the occurrence of a heat spot.

According to the method described in PTL 2, the thermal diffusivity of a steel plate is increased by defining an alloy element content. This suppresses temperature increase of a plate to be caused by frictional heat to suppress the occurrence of a heat spot.

According to the method described in PTL 3, austenitic stainless steel unlikely to be phase transformed is used as a material for a plate, thereby suppressing the occurrence of a heat spot.

According to the method described in PTL 4, a Ti precipitate or an Nb precipitate is used to suppress the occurrence of a heat spot.

According to the method described in PTL 5, in addition to using a Ti precipitate or an Nb precipitate, Si or Al having the effect of increasing a transformation point is added to suppress the occurrence of a heat spot.

In addition to enhancement of efficiency, reduction in friction loss, and reduction in size and weight of a transmission achieved by enhancing heat spot resistance, the antiwear performance of a spline part such as a tooth tip of the separator plate is also one important characteristic.

Methods described in PTLs 6 to 9 are known as techniques relating to enhancement of the antiwear performance of a tooth tip of the separator plate.

According to the method described in PTL 6, antiwear performance is enhanced by using a hard precipitate such as TiC or cementite.

According to the method described in PTL 7, a hot-rolled steel plate having a ferrite structure with ferrite particles of a diameter of 5 μm or more and 15 μm or less is cold rolled at rolling reduction of 50% or more, thereby enhancing antiwear performance.

According to the method described in PTL 8, a steel structure is controlled through combined addition of Cr, Ti, and B, thereby enhancing antiwear performance.

According to the method described in PTL 9, a steel structure is controlled by controlling a fraction of pearlite and that of cementite and controlling the diameter of ferrite particles, thereby enhancing antiwear performance.

CITATION LIST

Patent Literature

PTL 1: Japanese Laid-open Patent Publication No. 2005-249050
PTL 2: Japanese Laid-open Patent Publication No. 2005-249051
PTL 3: Japanese Laid-open Patent Publication No. 2005-249106
PTL 4: Japanese Laid-open Patent Publication No. 2008-266731
PTL 5: Japanese Laid-open Patent Publication No. 2010-132983
PTL 6: Japanese Laid-open Patent Publication No. 2001-73073
PTL 7: Japanese Laid-open Patent Publication No. 2003-277883
PTL 8: Japanese Laid-open Patent Publication No. 2007-211260
PTL 9: Japanese Laid-open Patent Publication No. 2004-162153

SUMMARY OF INVENTION

Technical Problem

However, the aforementioned methods of PTLs 1 to 5 are only responsive to some of the aforementioned four features A to D required to be handled regarding the separator plate. Further, the aforementioned methods of PTLs 1 to 5 have many problems to be solved including failing to achieve sufficient effect in terms of heat spot resistance, reduction in manufacturing performance, and increase in material cost.

As an example, PTLs 1, 2, and 3 do not consider how to handle the features A, B, and C, failing to achieve sufficient result in terms of enhancement of efficiency, reduction in friction loss, and reduction in size and weight of a transmission.

Regarding the austenitic stainless steel described in PTL 3, not only is it much more expensive than a steel plate generally used as a clutch plate, but stainless steel also has low heat conductivity which may cause a problem of increasing the temperature of a steel plate surface easily due to low diffusion performance of frictional heat.

The steel compositions described in PTLs 4 and 5 were actually examined and found to be able to enhance heat spot resistance. However, they fail to achieve sufficient results in terms of enhancement of efficiency, reduction in friction loss, and reduction in size and weight of a transmission.

PTL 5 describes addition of Si and Al. However, adding Si and Al causes many problems in terms of manufacturing and is not effective from an industrial viewpoint as it is likely to cause brittle fracture of a slab or a coil.

PTLs 6 to 9 are to merely enhance antiwear performance. Specifically, the separator plate is required not only to achieve high antiwear performance at a spline part but also to avoid damage on a counterpart drum or a counterpart case. Thus, simply being capable of enhancing antiwear performance is not sufficient for a material for the separator plate.

Controlling change in roughness of a surface in friction with the friction plate is also a different significant characteristic relating to wear or a wear phenomenon. Specifically, the performance of a surface of the separator plate against wear caused by a friction sheet of paper as a counterpart material is an important issue. Damage on the friction sheet of paper as a counterpart material of friction should certainly be avoided.

None of PTLs 6 to 9 gives consideration to providing both of two types of antiwear performances of different features at two sites, a spline part and a surface.

Regarding the property of a steel plate, bad punching performance lowers a shear surface ratio during punching into a plate of a given shape. This makes the occurrence of a flash or a burr and a secondary shear surface likely.

The nature of a punching surface degraded in this way becomes a cause for rattle, wear, damage or the like of a spline part if the steel plate is used as a clutch plate, for example.

Thus, a steel plate with favorable punching performance has been required as a material for a clutch plate, for example.

This invention has been made in view of the aforementioned issues. It is an object of this invention to provide a cold-rolled steel plate with favorable punching performance and a method of manufacturing the same.

Solution to Problem

A cold-rolled steel plate can have a chemical composition containing, on the basis of percent by mass, C from 0.03 to 0.08 %, Si from 0 to 1.0 %, Mn from 0.2 to 0.8%, P at 0.03% or less, S at 0.01% or less, and Al at 0.05% or less as to satisfy a formula (1): $5*C\%-Si\%+Mn\%-1.5*Al\%<1$, and at least one of Nb from 0.03 to 0.4%, V from 0.01 to 0.3%, and Ti from 0.01 to 0.3% so as to satisfy a formula (2): $0.04<(Nb\%/1.4)+(V\%/1.1)+Ti\%<0.3$, with a residue being formed of Fe and unavoidable impurities. An average diameter of particles of a carbide as a precipitate containing any of Nb, V and Ti is from 20 to 100 nm. A second phase structure having a longitudinal diameter of 5 μm or more has an area fraction of 5% or less in a cross-sectional structure. The cold-rolled steel plate has cross-sectional hardness from 200 to 350 HV.

According to a cold-rolled steel plate can have a chemical composition that contains, on the basis of percent by mass, at least one of Cr from 0.10 to 2.0%. Ni from 0.05 to 0.5%, Mo from 0.05 to 0.5%, and B from 0.0002 to 0.002% so as to satisfy a formula (3): $5*C\%-Si\%+Mn\%+1.6*Cr\%+0.8*Ni\%-1.5*Al\%<1$.

The average diameter of particles of the carbide containing any of Nb, V, and Ti is from 20 to 100 nm. The carbide is a precipitate in a front layer part extending at least 200 μm from a surface of the steel plate.

According to a method of manufacturing a cold-rolled steel plate, a steel slab having the chemical composition as recited above is smelted, the steel slab is heated to 1200° C. or more and hot rolled to form a hot-rolled steel plate, the hot-rolled steel plate is wound from 550 to 700° C. to form a hot-rolled coil, and the hot-rolled coil is cold rolled or the hot-rolled coil is annealed and cold rolled, thereby obtaining cross-sectional hardness from 200 to 350 HV.

The cold-rolled steel plate can have an average diameter of particles of the carbide containing any of Nb, V, and Ti is from 20 to 100 nm. The carbide is a precipitate in a front layer part extending at least 200 μm from a surface of the steel plate.

According to a method of manufacturing a cold-rolled steel plate the steel slab is heated to 1200° C. or more and hot rolled to form a hot-rolled steel plate, the hot-rolled steel plate is wound from 550 to 700° C. to form a hot-rolled coil, and the hot-rolled coil is cold rolled or the hot-rolled coil is annealed and cold rolled, thereby obtaining cross-sectional hardness from 200 to 350 HV.

Advantageous Effects of Invention

According to this invention, the chemical composition is regulated, the average diameter of particles of the precipitated carbide is from 20 to 100 nm, and the second phase structure having a longitudinal diameter of 5 μm or more has an area fraction of 5% or less in the cross-sectional structure, thereby being able to enhance punching performance. The cold-rolled steel plate of this invention is used appropriately not only as a separator plate but also as a friction plate or a dry clutch plate.

DESCRIPTION OF EMBODIMENTS

Figure 1:
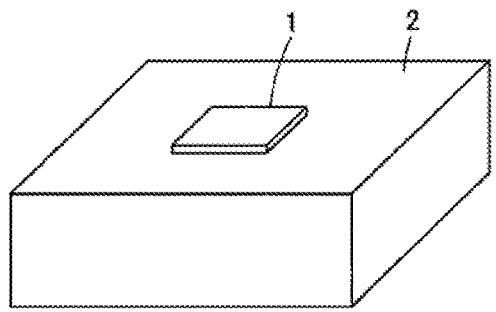
FIG. 1 is a perspective view showing a state before a test to examine heat spot resistance of a Working Example of this invention is conducted.

The following describes an embodiment of this invention.

A cold-rolled steel plate of this invention is used for example as a material and the like for a clutch plate in a multiplate wet clutch mechanism of an automatic transmission of an automobile.

A cause for the occurrence of a heat spot in a clutch plate made of a normal steel plate is described first.

If a clutch is engaged under high load, temperature increases considerably by friction in a surface of the clutch plate in the engaged state. This austenitizes a metal structure of the steel plate. In the steel plate, a region where austenitization occurs in response to temperature increase during engagement of the clutch is limited to a front layer of the steel plate. Temperature increase to a degree that causes phase transformation does not occur inside the steel plate.

The heated region in the surface of the steel plate is rapidly cooled (self-cooled) resulting from rapid heat conduction to the inside of the steel plate in a low temperature to be martensitically transformed.

If the part heated by friction is rapidly cooled by self-cooling to be martensitically transformed, a resultant martensitic structure expands in volume to create a heat spot that is a region like a projection projecting to a higher position than its surrounding area.

The change in shape occurring during the martensitic transformation applies compressive residual stress to a surrounding structure. This damages the flatness of the clutch plate to distort the clutch plate.

Such a heat spot is suppressed effectively by the following first to fourth countermeasures.

The first countermeasure is to suppress temperature increase of the clutch plate caused by frictional heat. More specifically, the heat conductivity of the steel plate forming the clutch plate is increased. This rapidly diffuses heat from a friction part in the surface of the clutch plate to a surrounding area, thereby suppressing abnormal temperature increase to occur locally in the outermost surface.

The heat conductivity of steel becomes highest in pure iron and becomes lower with increase in an alloy element added content. The heat conductivity also becomes lower with increase in the volume fraction of a second phase such as pearlite. Meanwhile, adding an alloy element into steel is necessary for ensuring appropriate strength and antiwear performance of the steel plate as a clutch plate.

Strength and antiwear performance required for the steel plate as a clutch plate are ensured and high heat conductivity is maintained effectively by forming a dispersed metal structure with fine precipitates dispersed uniformly in a ferrite structure.

The second countermeasure is to suppress transformation into the γ phase of a metal structure in a front layer part of the clutch plate even if the temperature of the clutch plate is increased by frictional heat. More specifically, even if temperature increase of the surface of the steel plate by the frictional heat is unavoidable, austenitization to occur resulting from temperature increase by friction is still suppressed by making austenite transformation of the steel plate itself unlikely.

Austenite transformation is suppressed effectively by increasing a transformation point or delaying dissolving of a carbide.

A transformation point is increased effectively by adding an element to increase a point of α to γ transformation (transformation point $A_3$) or reducing the added content of an element to reduce the transformation point $A_3$.

Dissolving is delayed effectively by making a carbide exist in steel with stable properties that prevent dissolving of the carbide as much as possible.

In carbon steel, α to γ transformation starts with dissolving of a carbide at an interface between the carbide and the mother phase. If the carbide is dissolved in the α phase or the γ phase easily, the α to γ transformation proceeds promptly. Meanwhile, if the carbide is not dissolved easily, progress of the α to γ transformation is suppressed.

The transformation point drops with C, Mn, and Ni, and increases with Si and Cr. Thus, it is important to minimize the respective added contents of C, Mn, and Ni as much as possible. Where needed, the respective added contents of Si and Cr may be increased in consideration of other conditions, for example.

An $Fe_3C$ (cementite: θ)-based material as a carbide has the property of being dissolved easily. Meanwhile, in the case of steel containing Cr, Cr tends to be concentrated in $Fe_3C$. The concentration of Cr stabilizes $Fe_3C$. Compared to $Fe_3C$, an Nb-based carbide, a V-based carbide, or a Ti-based carbide has the property of being remarkably stable and having a low degree of solubility in the γ phase.

Specifically, dispersing an Nb-based carbide, a V-based carbide, or a Ti-based carbide finely and uniformly is a considerably excellent method of ensuring the strength and antiwear performance of the steel plate. Thus, using an Nb-based carbide, a V-based carbide, or a Ti-based carbide is a preferable method of suppressing transformation into the γ phase. Adding Nb, V, or Ti is also an effective method of reducing C as an element that reduces a transformation point most prominently.

Therefore, strength and antiwear performance are ensured effectively by adding Nb, V, or Ti and forming a hard carbide. With the intention of reducing the amount of redundant C not to be bonded to Nb, V, or Ti, an optimum added content is determined in consideration of a relationship of an Nb added content, a V added content, or a Ti added content with the amount of C. This reduces the amount of dissolved C in a part heated by friction, thereby being able to suppress transformation into the γ phase.

The third countermeasure is to suppress martensitic transformation to be caused by self-cooling of the clutch plate even if temperature increase by frictional heat transforms a metal structure in a front layer part of the clutch plate into the γ phase. More specifically, even if temperature increase and transformation into the γ phase of the surface of the steel plate are unavoidable, martensitic transformation to be caused by self-cooling is still suppressed by reducing the quenching performance of the steel plate.

The quenching performance is reduced effectively by reducing the added content of an element to enhance the quenching performance and by making the diameter of γ crystal grains finer.

What is important is to minimize the respective added contents of Si, Mn, Ni, Cr, Mo, B, etc. to reduce (or to not enhance) the quenching performance.

The diameter of γ crystal grains is made finer effectively through use of a grain boundary pinning effect achieved by a fine precipitate. More specifically, an Nb-based carbide, a V-based carbide, a Ti-based carbide, and a nitride are dispersed finely to make the diameter of γ grains finer. This facilitates nucleation in the α phase during cooling from the γ phase, thereby reducing the quenching performance. Such use of Nb, V, and Ti is considerably effective as it not only acts to enhance heat conductivity and suppress transformation into the γ phase but also acts to enhance strength and antiwear performance.

The fourth countermeasure is to suppress deformation of the clutch plate due to transformation stress even if temperature increase by frictional heat transforms a metal structure in the front layer part of the clutch plate into the γ phase to martensitically transform the metal structure as a result of self-cooling. More specifically, even if martensitic transformation (conversion to a heat spot) of a heated part in the surface of the steel plate is unavoidable, distortion of the clutch plate due to the heat spot is suppressed by ensuring sufficient strength of a metal structure surrounding the heat spot.

As described above, the heat spot itself is considered to be a martensitic region resulting from heating and rapid cooling of a friction part. Though not as high as in the heat spot, temperature increases in a surrounding area of the heat spot resulting from frictional heat to affect the metal structure. The heat spot is subjected to phase transformation from α to γ and then to martensite. However, the surrounding of the heat spot is not heated to a degree that causes transformation into the γ phase, so that it becomes soft in many cases resulting from its material structure. More specifically, a steel plate generally used as a clutch plate has hardness controlled to be from about 220 to about 320 HV through hardening by cold rolling. In the surrounding area of the heat spot, the cold rolling causes recovery and recrystallization of a worked structure with heat resulting from frictional heat, thereby reducing hardness.

Thus, softening of the surrounding area of the heat spot can be suppressed by suppressing recovery and recrystallization of a cold-rolled structure. More specifically, by adding Nb, V, or Ti and forming a structure containing a thermally stable Nb-based carbide, V-based carbide, or Ti-based carbide dispersed uniformly in the structure, recrystallization can be suppressed and reduction in hardness can be suppressed effectively.

Punching performance is determined based on the nature of a punching surface resulting from a general-purpose punching method. An excellent punching surface has a high shear surface ratio, a low probability of a burr or a flash, and a low probability of a secondary shear surface at a cross section subjected to a punching process. Specifically, reducing the probability of a fracture surface, a secondary shear surface, and a burr (flash) at the processed cross section suppresses the occurrence of fine powder (contaminants) due to these factors. This makes it possible to reduce a cause for a defect to occur inside a transmission if the steel plate is used as a clutch plate, for example.

The punching performance of the steel plate is enhanced effectively by making a cross-sectional structure a substantially single phase structure of ferrite and making a second phase exist uniformly in small quantities. Suppressing formation of the cross-sectional structure into a structure with bands is also an effective way. Providing the steel plate with appropriate hardness is another effective way.

Based on the aforementioned first, second, third, fourth countermeasures, etc. and the aforementioned countermeasures to be taken regarding punching performance, the chemical composition of a cold-rolled steel plate is defined as follows. Unless otherwise stated, the content of each element is expressed on the basis of percent by mass.

Specifically, the cold-rolled steel plate has a chemical composition containing C from 0.03 to 0.08%, Si from 0 to 1.0% (including a case where Si is not added), Mn from 0.2 to 0.8%, P at 0.03% or less (excluding a case where P is not added), S at 0.01% or less (excluding a case where S is not added), and Al at 0.05% or less (excluding a case where Al is not added) so as to satisfy a formula (1): 5*C %−Si %+Mn %−1.5*Al %<1, and at least one of Nb from 0.03 to 0.4%, V from 0.01 to 0.3%, and Ti from 0.01 to 0.3% so as to satisfy a formula (2): 0.04<(Nb %/1.4)+(V %/1.1)+Ti %<0.3, with a residue being formed of Fe and unavoidable impurities. In the formula (1), C % means the content of C (%), Si % means the content of Si (%), Mn % means the content of Mn (%), and Al % means the content of Al (%). In the formula (2), Nb % means the content of Nb (%), V % means the content of V (%), and Ti % means the content of Ti (%).

If the occasion arises, at least one of Cr, Ni, Mo, and B may be added as follows to the aforementioned chemical composition.

More specifically, in addition to the aforementioned chemical components, the chemical composition may contain at least one of Cr from 0.10 to 2.0%, Ni from 0.05 to 0.5%, Mo from 0.05 to 0.5%, and B from 0.0002 to 0.002% so as to satisfy a formula (3): 5*C %−Si %+Mn %+1.6*Cr %+0.8*Ni %−1.5*Al %<1. In the formula (3). C % means the content of C (%), Si % means the content of Si (%), Mn % means the content of Mn (%), Cr % means the content of Cr (%), Ni % means the content of Ni (%), and Al % means the content of Al (%).

Each element and the content of each element in the cold-rolled steel plate are described below.

Regarding C (carbon), a content below 0.03% makes it difficult to form hard carbide particles to contribute to antiwear performance. Meanwhile, in response to increase in the content of C, the point of transformation from α to γ drops, hardness and a dilation deformation amount are increased in a part heated by frictional heat during formation of a martensitic structure, and thermal conductivity is reduced. Further, increase in the content of C generates more hard structures such as a pearlite structure, a bainite structure, a cementite phase ($Fe_3C$), or a ferrite structure containing fine cementite dispersed in grains, thereby degrading punching performance. Then, an upper limit of the content of C determined within a range satisfying the relationship of the formula (1) or (3) in consideration of a balance with other characteristics is 0.08%. Thus, the content of C is determined to be from 0.03% or more and 0.08% or less.

Regarding Si (silicon), a content below 0.4% is sufficient if Si is to be added for the general purpose of deoxidization. Meanwhile, Si has the effect of increasing the point of transformation from $\alpha$ to $\gamma$, so that the content of Si may exceed 0.4%. Adding Si excessively to a content exceeding 1.0% is likely to cause brittle fracture during rolling of a steel plate, for example. Thus, the content of Si is determined to be (0% including a case where Si is not added) or more and 1.0% or less.

Regarding Mn (manganese), Mn is an element necessary for enhancing the strength of a material steel plate and should be added to a content of 0.2% or more for enhancing the strength. Meanwhile, Mn has the effect of reducing the point of transformation from $\alpha$ to $\gamma$. Thus, adding Mn to a content exceeding 0.8% reduces the point of transformation from $\alpha$ to $\gamma$. Thus, the content of Mn is determined to be from 0.2% or more and 0.8% or less. As the content of Mn increases, a hot-rolled steel plate is more likely to be formed into a structure with bands and the nature of the hot-rolled steel plate at a punching cross section formed by a punching process is more likely to be degraded. Thus, it is more preferable that the content of Mn be 0.6% or less.

Regarding P (phosphorus), adding P to a content exceeding 0.03% reduces punching performance and toughness. Thus, the content of P is determined to be 0.03% or less (excluding a case where P is not added).

Regarding S (sulfur), S forms MnS. Adding S to a content exceeding 0.01% makes the occurrence of a fracture surface likely in a cross-sectional structure due to soft MnS expanded through rolling. Thus, the content of S is determined to be 0.01% or less (excluding a case where S is not added).

Regarding Al (aluminum), Al is an element having deoxidizing effect. A content below 0.01% is sufficient if Al is to be added only for the purpose of deoxidization. Meanwhile, Al has the effect of increasing the point of transformation from $\alpha$ to $\gamma$, so that the content of Al may exceed 0.01%. In the case of steel containing Nb, V, or Ti to a given concentration, adding Al in large quantities to this steel to a content exceeding 0.05% does not work advantageously in terms of the effect of increasing a transformation point. Thus, the content of Al is determined to be 0.05% or less (excluding a case where Al is not added).

Regarding Cr (chromium), Ni (nickel), Mo (molybdenum), and B (boron), these elements have the effect of enhancing antiwear performance and toughness. Thus, it is preferable that these elements be added if a counterpart spline to make a fit with a spline part of a separator plate is hard as a result of a surface hardening process such as carburizing or nitriding, for example.

If Cr is to be added, the content of Cr is determined to be 0.10% or more and 2.0% or less in consideration of its effect of enhancing antiwear performance and its side effect.

If Ni is to be added, the content of Ni is determined to be 0.05% or more and 0.5% or less in consideration of its effect of enhancing toughness and its side effect.

If Mo is to be added, the content of Mo is determined to be 0.05% or more and 0.5% or less in consideration of its effect of enhancing toughness and its side effect.

If B is to be added, the content of B is determined to be 0.0002% or more and 0.002% or less in consideration of its effect of enhancing toughness and its side effect.

If Cr or Ni is to be added, the effect of Cr or that of Ni affects the point of transformation from $\alpha$ to $\gamma$ and the quenching performance of a cold-rolled steel plate. To increase the point of transformation from $\alpha$ to $\gamma$ and to reduce the quenching performance, the respective contents of C, Si, Mn, and Al, and those of Cr and Ni should be considered comprehensively so as to satisfy the relationship defined by the formula (3): $5*C\ \%-Si\ \%+Mn\ \%+1.6*Cr\ \%+0.8*Ni\ \%-1.5*Al\ \%<1$.

Regarding Nb (niobium), V (vanadium), and Ti (titanium), Nb, V, and Ti are each bonded to C in steel to form a hard carbide, contributing to enhancement of antiwear performance. Further, Nb, V, and Ti have the effect of fixing carbon in the steel to become NbC, VC, and TiC respectively of low degrees of solubility and suppressing $\alpha$ to $\gamma$ transformation in a part heated by frictional heat. Additionally, Nb, V, and Ti effectively suppress coarsening of the diameter of ferrite crystal grains and softening in a part where a temperature is to be increased by friction. That is, containing Nb, V or Ti contributes to enhancement of heat spot resistance and antiwear performance.

To achieve the aforementioned effect relating to heat spot resistance and antiwear performance by adding at least one of Nb, V and Ti, Nb, V, and Ti should be added to 0.03% or more, 0.01% or more, and 0.01% or more respectively. Meanwhile, containing Nb, V, and Ti at a content exceeding 0.4%, a content exceeding 0.3%, and a content exceeding 0.3% respectively increases the hardness of a hot-rolled steel plate. This makes it impossible to manufacture steel for a plate of an intended thickness and intended hardness of the plate as a product. Thus, the content of Nb is determined to be 0.03% or more and 0.4% or less, that of V is determined to be 0.01% or more and 0.3% or less, and that of Ti is determined to be 0.01% or more and 0.3% or less.

Heat spot resistance, antiwear performance, and other side effects are affected by the respective effects of the elements Nb, V, and Ti to be added. Thus, the respective contents of these elements should be considered comprehensively. At least one of Nb, V, and Ti should be added within the aforementioned range of the corresponding contents of Nb, V, and Ti so as to satisfy the relationship defined by the formula (2): $0.04<(Nb\ \%/1.4)+(V\ \%/1.1)+Ti\ \%<0.3$.

An Nb-based carbide, a V-based carbide, and a Ti-based carbide are considerably significant elements for enhancing heat spot resistance and antiwear performance. Specifically, an Nb-based carbide, a V-based carbide, and a Ti-based carbide in a surface of a steel plate exert their effects for enhancing heat spot resistance and antiwear performance at a surface of a spline part in friction with a counterpart spline. For this purpose, the Nb-based carbide, the V-based carbide, and the Ti-based carbide should be dispersed finely and uniformly.

More specifically, an average diameter of particles of a precipitate in a steel plate, specifically that of particles of a carbide containing any of Nb, V, and Ti should be in a range from 20 nm or more and 100 nm or less.

In particular, an Nb-based carbide, a V-based carbide, and a Ti-based carbide existing in a surface of the steel plate and a front layer part near the surface largely affect heat spot resistance and antiwear performance. Thus, it is preferable that an average diameter of particles of a carbide containing any of Nb, V, and Ti be 20 am or more and 100 nm or less existing in the front layer part, which is a layer extending at least 200 µm from the surface of the steel plate.

Meanwhile, an Nb-based carbide, a V-based carbide, and a Ti-based carbide existing in positions such as those in a central part of the cross-sectional direction of the steel plate deeper than the front layer part do not contribute much to heat spot resistance. If given excellent antiwear performance, these carbides in turn cause the risk of damage on a counterpart material. Thus, an average diameter of particles of the Nb-based carbide, that of particles of the V-based carbide, and that of particles of the Ti-based carbide existing in the central part of the cross-sectional direction of the steel plate are only required to be substantially the same as those of the corresponding particles in the front layer part. An Nb-based carbide, a V-based carbide, and a Ti-based carbide in the central part of the cross-sectional direction existing in excessively larger quantities than the corresponding carbides in the front layer part in turn are not preferable when using a cold-rolled steel plate as a clutch plate. Thus, like that of particles of a carbide containing any of Nb, V, and Ti in the front layer part, it is preferable that an average diameter of particles of a carbide containing any of Nb, V, and Ti in the central part of the cross-sectional direction of the steel plate or that of particles of such a carbide in a layer deeper than the depth of 200 µm from the surface of the steel plate be 20 nm or more and 100 nm or less.

In addition to Nb, V, and Ti, W (tungsten), Ta (tantalum), Zr (zirconium), and Hf (hafnium) may be added as elements to form hard carbides.

A cross-sectional structure includes the ferrite phase as a mother phase, and second phase structures harder than the ferrite phase including a pearlite structure, a bainite structure, a cementite structure, and a structure of a second phase other than cementite dispersed finely in a ferrite structure. A difference in hardness is generated in the cross-sectional structure between these second phase structures as hard structures and a ferrite base material softer than the second phase structures. If the difference in hardness between the ferrite base material and the second phase structures becomes large depending on the quantities, sizes or hardness of the second phase structures dispersed in the cross-sectional structure, a difference in deformability is generated to make the occurrence of a crack likely at an interface between the second phase structure and the ferrite structure resulting from deformation caused by a punching process. As a result, a fracture surface is caused easily to reduce a primary shear surface ratio.

Thus, it is preferable that, for enhancement of punching performance, a steel plate have a cross-sectional structure in a substantially single phase structure of ferrite containing a second phase existing uniformly in small quantities. The area fraction of a second phase structure in the cross-sectional structure is an important issue.

If the area fraction of a second phase structure having a longitudinal diameter of 5 µm or more exceeds 5% in the cross-sectional structure, this second phase structure exerts prominent influence to reduce punching performance. Thus, the volume fraction of the second phase structure having a longitudinal diameter of 5 µm or more is determined to be 5% or less in the cross-sectional structure of a steel plate. The size, quantity, or hardness of this second phase structure in the cross-sectional structure can be adjusted, for example, by controlling the content of C in the steel plate or a temperature of winding performed after hot rolling. Generally, the size of the second phase structure is determined based on the longitudinal diameter thereof, which is a length in a direction where this second phase structure grows.

A manufacturing method of this invention is described next.

First, a steel slab is smelted that has a chemical composition containing C from 0.03 to 0.08%, Si from 0 to 1.0% (including a case where Si is not added), Mn from 0.2 to 0.8%, P at 0.03% or less (excluding a case where P is not added), S at 0.01% or less (excluding a case where S is not added), and Al at 0.05% or less (excluding a case where Al is not added) so as to satisfy the formula (1), and at least one of Nb from 0.03 to 0.4%, V from 0.01 to 0.3%, and Ti from 0.01 to 0.3% so as to satisfy the formula (2), with a residue being formed of Fe and unavoidable impurities.

If at least one of Cr, Ni, Mo, and B is to be added, the chemical composition of the smelted steel slab contains, in addition to each of the aforementioned chemical components, at least one of Cr from 0.10 to 2.0%, Ni from 0.05 to 0.5%, Mo from 0.05 to 0.5%, and B from 0.0002 to 0.002% so as to satisfy the formula (3).

This steel slab is heated to 1200° C. or more and then hot rolled. A heating temperature below 1200° C. leads to the probability of failing to dissolve a carbide sufficiently.

For the hot rolling, it is preferable that a hot rolling finishing temperature be set to be higher than an $Ar_3$ transformation point in terms of the quality of a hot-rolled steel plate and hot rolling efficiency, for example. Specifically, it is preferable that the finishing temperature be determined to be 850° C. or more and 950° C. or less.

A winding temperature for the hot-rolled steel plate below 550° C. produces many hard structures. Determining the winding temperature to be 550° C. or more can reduce a hard structure to produce a structure close to a single phase of ferrite. Meanwhile, a winding temperature exceeding 700° C. decarburizes a surface of the steel plate notably. This reduces the quantity of the precipitate of the carbide in the outermost layer part and reduces the diameter of particles of the carbide. Thus, the winding temperature is determined to be 550° C. or more and 700° C. or less and a hot-rolled coil formed by winding the hot-rolled steel plate in this temperature range is used as a material.

Moderate cooling to reduce a temperature from the finishing temperature to the winding temperature at an average cooling rate below 20° C. per second coarsens the precipitated carbide. Thus, it is preferable that the average cooling rate be 20° C. per second or more.

The hot-rolled steel plate is subjected to acid pickling to remove scales from the surface and is then cold rolled to become a product. More specifically, to obtain hardness required for the steel plate as a clutch plate, particularly as a separator plate, the steel plate should be cold rolled at a cold rolling ratio of 20% or more and 70% or less. The hardness is controlled by controlling the rolling ratio.

A cold-rolled steel plate used as a product is required to have hardness of 200 HV or more and 350 HV or less and flatness in terms of punching performance. To ensure flatness, it is preferable that the cold rolling ratio be controlled in a range of 20% or more and 70% or less. Hardness below 200 HV causes serious sagging and a serious burr of a punched item and causes a secondary shear surface, degrading the nature of a spline pan. Meanwhile, hardness exceeding 350 HV causes serious wear or damage of a punch die while failing to form a shear surface in a punching surface, which is not preferable as the shape of a spline part.

If the occasion arises, annealing may be performed directly on the hot-rolled steel plate or may be performed as intermediate annealing on the cold-rolled steel plate. In either case, it is preferable that the steel plate be cold rolled after the annealing. If the intermediate annealing is to be performed during the cold rolling process, a suitable annealing condition can be selected appropriately in view of the thickness of a product and the cold rolling ratio. However, an annealing condition to cause surface decarburization is not preferable.

Regarding the aforementioned cold-rolled steel plate, the chemical composition is regulated based on the aforementioned first to fourth countermeasures and the aforementioned countermeasures to be taken regarding punching performance. Further, an average diameter of particles of a precipitated Nb-based carbide, that of particles of a precipitated V-based carbide, or that of particles of a precipitated Ti-based carbide is determined to be 20 nm or more and 100 nm or less. Additionally, a hard structure having hardness of 200 HV or more and a longitudinal diameter of 5 μm or more is determined to occupy a volume fraction of 5% or less in a cross-sectional structure, thereby being able to enhance punching performance.

According to the conventional techniques, an alloy element added content should be reduced to enhance heat spot resistance while an alloy element required for enhancing antiwear performance should be added to enhance strength. Thus, enhancement of heat spot resistance and that of antiwear performance cannot be well balanced. Meanwhile, the aforementioned cold-rolled steel plate can enhance heat spot resistance and antiwear performance in a well-balanced manner. In addition to balancing heat spot resistance and antiwear performance with each other, the aforementioned cold-rolled steel plate achieves enhancement of punching performance.

As a result, a punching surface can be provided with excellent nature through a conventional punching process. Specifically, the occurrence of a fracture surface, a secondary shear surface, and a burr or a flash can be suppressed in the punching surface. This can reduce a cause for a defect to occur inside a transmission if the cold-rolled steel plate is used as a material for a clutch plate, for example.

A fine and hard carbide dispersed in the steel plate achieves the effect of suppressing a plastic flow and a micro fracture in a friction part, thereby being able to suppress adhesive wear resulting from friction between steel and steel.

With the excellent nature of a punching surface, a clearance from a counterpart spline part can be set to be small. This can suppress a rattle occurring during actuation, thereby reducing an impact on a spline part. If the punching surface is flat, a contact surface pressure is reduced to suppress wear that is to occur resulting from contact with the counterpart spline part. This suppresses an impact or a surface pressure on the counterpart spline part, thereby reducing wear on the side of a material as a contact counterpart.

As seen from the foregoing, the aforementioned cold-rolled steel plate has excellence in terms of antiwear performance at a spline part (suppression of wear of the plate itself) and aggression toward a material as a contact counterpart (suppression of wear and damage of a counterpart spline part). From a viewpoint of these aspects relating to antiwear performance, the aforementioned cold-rolled steel plate is used appropriately as a material for a clutch plate, for example.

The aforementioned cold-rolled steel plate is used appropriately not only as a separator plate of a multiplate wet clutch but also as a friction plate of the multiplate wet clutch or a dry clutch plate.

EXAMPLES

Working Examples and Comparative Examples are described below.

Steel slabs having chemical compositions shown in Table 1 were smelted. Referring to Table 1, if at least one of Cr, Ni, Mo, and B was not added, a value of the left side of the formula (1) is shown as a Q value. If at least one of Cr, Ni, Mo, and B was added, a value of the left side of the formula (3) is shown as the Q value.

TABLE 1

(Percent by mass)

| Steel | | C | Si | Mn | P | S | Cr | Ti | Nb | Ni | V | Mo | B | Al | Q value | Formula (2) |
|---|---|---|---|---|---|---|---|---|---|---|---|---|---|---|---|---|
| Comparative | 1 | 0.07 | 0.28 | 0.54 | 0.012 | 0.006 | — | 0.01 | — | — | — | — | — | 0.010 | 0.60 | 0.01 |
| Examples | 2 | 0.22 | 0.22 | 0.48 | 0.016 | 0.003 | — | 0.17 | 0.05 | — | — | — | — | 0.007 | 1.35 | 0.21 |
| | 3 | 0.12 | 0.07 | 0.67 | 0.015 | 0.005 | — | 0.17 | — | — | — | — | — | 0.012 | 1.18 | 0.17 |
| | 5 | 0.10 | 1.23 | 0.44 | 0.014 | 0.004 | — | 0.10 | — | — | — | 0.08 | — | 0.015 | −0.31 | 0.10 |
| | 6 | 0.02 | 0.04 | 0.41 | 0.009 | 0.005 | — | 0.11 | — | — | — | — | — | 0.009 | 0.46 | 0.11 |
| | 7 | 0.07 | 0.06 | 0.32 | 0.015 | 0.005 | — | 0.47 | — | — | — | — | — | 0.011 | 0.59 | 0.47 |
| | 8 | 0.11 | 0.06 | 0.37 | 0.016 | 0.007 | — | 0.16 | 0.35 | — | — | — | — | 0.011 | 0.84 | 0.41 |
| | 9 | 0.08 | 0.05 | 1.30 | 0.011 | 0.004 | — | 0.06 | 0.01 | — | — | — | — | 0.190 | 1.37 | 0.06 |
| | 10 | 0.15 | 0.05 | 1.32 | 0.016 | 0.004 | — | 0.22 | — | — | — | — | — | 0.041 | 1.96 | 0.22 |
| Working Example | 11 | 0.07 | 0.11 | 0.41 | 0.011 | 0.004 | — | 0.07 | — | — | — | — | — | 0.006 | 0.64 | 0.07 |
| Comparative Example | 12 | 0.11 | 0.07 | 0.38 | 0.009 | 0.003 | — | 0.14 | — | — | — | — | — | 0.011 | 0.84 | 0.14 |
| Working | 13 | 0.07 | 0.03 | 0.38 | 0.014 | 0.006 | — | 0.10 | 0.07 | — | — | — | — | 0.009 | 0.69 | 0.15 |
| Examples | 14 | 0.05 | 0.05 | 0.35 | 0.008 | 0.004 | 0.11 | 0.25 | 0.06 | — | — | — | — | 0.007 | 0.72 | 0.25 |
| | 15 | 0.06 | 0.07 | 0.40 | 0.012 | 0.003 | — | 0.09 | — | — | — | — | — | 0.010 | 0.62 | 0.09 |
| | 16 | 0.05 | 0.12 | 0.50 | 0.009 | 0.004 | — | 0.10 | — | — | — | — | 0.001 | 0.010 | 0.62 | 0.14 |
| | 17 | 0.06 | 0.05 | 0.36 | 0.012 | 0.003 | — | 0.08 | — | 0.10 | — | — | — | 0.011 | 0.59 | 0.17 |
| | 18 | 0.05 | 0.07 | 0.39 | 0.009 | 0.005 | — | 0.10 | — | — | — | 0.13 | — | 0.009 | 0.56 | 0.10 |
| | 19 | 0.05 | 0.11 | 0.41 | 0.010 | 0.005 | — | 0.09 | — | — | 0.11 | — | — | 0.008 | 0.54 | 0.19 |
| Comparative Example | 20 | 0.11 | 0.15 | 0.55 | 0.013 | 0.005 | — | 0.07 | — | — | — | — | — | 0.013 | 0.93 | 0.07 |
| Working Examples | 21 | 0.07 | 0.78 | 0.72 | 0.014 | 0.004 | — | 0.16 | — | — | — | — | — | 0.020 | 0.26 | 0.16 |
| | 22 | 0.07 | 0.15 | 0.44 | 0.011 | 0.003 | — | 0.07 | — | 0.43 | — | — | — | 0.020 | 0.95 | 0.07 |
| | 23 | 0.04 | 0.05 | 0.40 | 0.012 | 0.005 | — | 0.08 | — | — | — | — | — | 0.018 | 0.52 | 0.08 |
| | 24 | 0.03 | 0.04 | 0.31 | 0.009 | 0.004 | — | 0.05 | — | — | — | — | 0.002 | 0.015 | 0.40 | 0.05 |
| | 25 | 0.04 | 0.07 | 0.52 | 0.013 | 0.006 | — | 0.06 | — | — | 0.05 | — | — | 0.013 | 0.63 | 0.11 |
| | 26 | 0.04 | 0.04 | 0.37 | 0.013 | 0.005 | — | — | 0.10 | — | — | — | — | 0.024 | 0.49 | 0.07 |
| | 27 | 0.05 | 0.05 | 0.39 | 0.011 | 0.004 | — | — | 0.35 | — | — | — | — | 0.020 | 0.56 | 0.25 |
| | 28 | 0.05 | 0.03 | 0.35 | 0.010 | 0.003 | — | — | — | 0.07 | — | — | — | 0.022 | 0.54 | 0.06 |
| | 29 | 0.06 | 0.05 | 0.36 | 0.014 | 0.005 | — | — | — | — | 0.27 | — | — | 0.014 | 0.59 | 0.25 |
| | 30 | 0.04 | 0.04 | 0.40 | 0.015 | 0.003 | — | — | 0.15 | — | 0.10 | — | — | 0.028 | 0.52 | 0.20 |
| | 31 | 0.06 | 0.02 | 0.38 | 0.012 | 0.004 | — | 0.12 | 0.10 | — | 0.10 | — | — | 0.020 | 0.63 | 0.28 |
| | 32 | 0.05 | 0.03 | 0.39 | 0.010 | 0.004 | — | 0.06 | 0.08 | — | 0.05 | — | — | 0.022 | 0.58 | 0.16 |
| | 33 | 0.05 | 0.05 | 0.36 | 0.011 | 0.005 | — | 0.03 | 0.02 | — | 0.02 | — | — | 0.019 | 0.53 | 0.06 |

TABLE 1-continued (Percent by mass)

| | Steel | C | Si | Mn | P | S | Cr | Ti | Nb | Ni | V | Mo | B | Al | Q value | Formula (2) |
|---|---|---|---|---|---|---|---|---|---|---|---|---|---|---|---|---|
| Comparative Examples | 34 | 0.11 | 0.05 | 0.36 | 0.012 | 0.003 | — | — | 0.12 | — | 0.08 | — | — | 0.024 | 0.82 | 0.16 |
| | 35 | 0.10 | 0.06 | 0.38 | 0.014 | 0.005 | — | — | 0.32 | — | — | — | — | 0.021 | 0.79 | 0.23 |
| | 36 | 0.04 | 0.07 | 0.45 | 0.009 | 0.014 | — | 0.09 | — | — | — | — | — | 0.021 | 0.55 | 0.09 |
| Working Example | 37 | 0.06 | 0.21 | 0.62 | 0.011 | 0.008 | — | 0.11 | — | — | — | — | — | 0.025 | 0.67 | 0.11 |

Using various types of steel slabs, hot rolling and cold rolling were performed under conditions shown in Table 2 to produce various types of samples.

The hot rolling was performed at a heating temperature of 1250° C. or 1100° C. A winding temperature was set at any of 450° C., 520° C., 570° C., 600° C., 630° C., 650° C., and 720° C.

After being pickled with hydrochloric acid, the hot-rolled steel plates were finished to a thickness of 1.8 mm at various cold rolling ratios. Target cross-sectional hardness at a time after the cold rolling was 250 HV. According to some of the Working Examples and some of the Comparative Examples, a hot-rolled steel plate was annealed at 690° C. and then cold rolled.

Each of these samples of cold-rolled steel plates was subjected to measurement of heat conductivity, measurement of cross-sectional hardness, and measurement of an average diameter of particles of a precipitated carbide (Nb-based carbide (NbC), V-based carbide (VC or $V_4C_3$ and hereinafter called VC), and Ti-based carbide (TIC)), and measurement of the volume fraction of a hard structure in a cross-sectional structure.

Further, a test piece was extracted from each sample and was subjected to a punching test, a pin-on-disk friction and wear test, and a heat spot resistance test.

For the measurement of heat conductivity, heat conductivity was measured in a range from 100 to 200° C. using a laser flash method. A test piece with measured heat conductivity of 50 W/m·K or more was evaluated as being good and is identified with o in Table 2.

For the measurement of cross-sectional hardness, a part of each sample was cut out, buried in resin, and polished. Then, Vickers hardness was measured at a thickness central part of a cross section. A measuring load was 50 gf.

For the measurement of an average diameter of particles of a carbide in a front layer, a part of each sample was cut and buried in resin so as to obtain an observation surface at one surface of a cold-rolled steel plate. Then, this part was polished parallel to the surface of the cold-rolled steel plate so as to obtain an observation surface in a position at a depth from 50 to 150 μm in a thickness direction from the surface of the cold-rolled steel plate. Then, this part was etched to produce an extraction replica and a precipitate was observed. Regarding Nb, V, and Ti, an observed precipitate resulting from addition of Nb alone was NbC, an observed precipitate resulting from addition of V alone was VC, and an observed precipitate resulting from addition of Ti alone was TiC. Further, an observed precipitate resulting from combined addition was a carbide corresponding to any of NbC, VC, and TiC. A transmission electron microscope (TEM) was used for the observation. The size of the precipitate was determined in terms of a circle with an image analyzer and the diameter of each precipitate was calculated. An imaging magnification ratio was 50,000 and ten fields of view were observed. A sum of the calculated particle diameters of the precipitates was divided by the number of the precipitates to obtain an average particle diameter. Regarding the average particle diameter of the precipitates of each sample measured in this way, an average particle diameter below 20 nm is identified with A, an average particle diameter from 20 to 100 nm is identified with B, and an average particle diameter exceeding 100 nm is identified with C in Table 2.

The area fraction (ratio) of a hard structure was measured by the following procedure. A part of each sample was cut and buried in resin so as to obtain an observation surface at a plane including a rolling direction and a thickness direction of a cold-rolled steel plate. This part was thereafter mirror finished through wet polishing and buffing and then etched with 5% of natal. Then, a structure was observed with a scanning electron microscope. A second phase structure means α phase or a structure different from the ferrite phase structure as a mother phase. The size of this second phase structure was observed in a visual sense under the microscope or in a photograph. Regarding the size of the second phase structure, a longitudinal diameter was used as a representative value.

For the punching test, a circular hole of a thickness of 1.8 mm and a diameter of 10 mm was punched out of each test piece using a 300 kN universal tester. For a punch die, SKD11 conforming to the JIS standards mainly for cold work dies having a punch and a dice both adjusted to 60 HRC was used. The test was conducted under conditions of a punching speed of 1.7 mm/sec. and a clearance of 5%. A punched item with 20 to 30 punching shots was collected and was evaluated in terms of the amount of sagging at a shear surface and a primary shear surface ratio. More specifically, each index was measured and an average was calculated in a direction in which a material steel plate was rolled and in a direction at a right angle to the rolling direction. A test piece with a primary shear surface ratio of 50% or more and sagging below 0.2 mm was evaluated as being good and is identified with o in Table 2. Referring to Table 2, a test piece with a primary shear surface ratio below 50% is identified with ▲, a test piece with sagging of 0.2 mm or more is identified with ▼, and a test piece subjected to the occurrence of a secondary shear surface is identified with x.

For the pin-on-disk friction and wear test, the wear test was conducted using a pin-on-disk friction and wear tester while mission oil was dropped. More specifically, a wear test test piece of 10 mm by 30 mm was formed through a punching process (clearance of 5%) out of a cold-rolled steel plate of a thickness of 1.8 mm. This wear test test piece was fixed so as to form a test surface of 1.8 mm by 10 mm to contact a disk in the pin-on-disk friction and wear tester. A quenched and tempered item of S45C having hardness of 450 HV was used as the disk. While the wear test test piece was pressed against the disk under a test load of 100 N, the wear test was conducted under the conditions of a friction speed of 0.6 m/sec. and a friction distance of 800 m. A wear test test piece with a wear height below 0.1 mm was evaluated as being good and is identified with o in Table 2. In Table 2, a wear test test piece with a wear height of 0.1 mm or more is identified with ▲ and a wear test test piece subjected to serious adhesion is identified with x.

If a difference in a primary shear surface ratio is generated between test pieces resulting from a punching process, a larger primary shear surface ratio makes a substantial contact surface pressure lower, showing a tendency to reduce a wear amount. Specifically, not only the antiwear performance of steel itself but also a primary shear surface ratio becomes an important factor relating to a wear amount.

The heat spot resistance test (rapid heating and rapid cooling test) was conducted through a method of heating a front layer part locally by applying powerful laser light for a short period of time to a surface of a test piece. Specifically, after the surface of the steel plate was heated with the laser light, the laser irradiation was stopped. Then, the self-cooling effect of the steel plate rapidly cooled the heated part to produce a characteristic altered layer (layer containing martensite subjected to structure change) in a heat spot. Even in the absence of the martensitic phase, temperature increase resulting from the laser irradiation may cause recrystallization of a material steel plate hardened by cold rolling to form coarse crystal grains, thereby reducing hardness in some cases. If the altered layer is formed in this way resulting from either hardening or softening, a difference is generated between cross-sectional hardness inside the material steel plate and hardness at the laser-irradiated part. This allows evaluation of heat spot resistance by means of measurement of cross-sectional hardness at a front layer part and internal cross-sectional hardness.

The following describes in detail how this heat spot resistance test was conducted. As shown in FIG. 1, a test piece 1 of 25 mm by 25 mm extracted from each sample was fixed with a bolt not shown in the drawings to a central part of a surface of a steel block 2 of 60 mm by 60 mm and a thickness of 20 mm. Then, a laser beam was applied to a central part of a surface of the test piece 1. Regarding conditions for the irradiation, a $CO_2$ laser was applied with an effective output of 1080 W, a beam shape was 6 mmφ in diameter, and an irradiation time was 0.75 seconds.

Figure 2A:
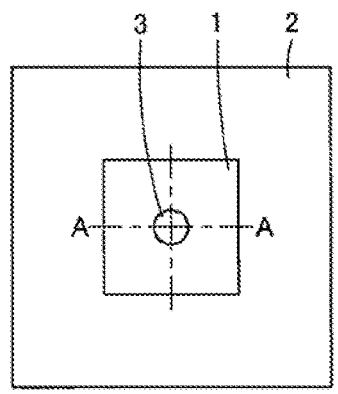
FIG. 2A is a plan view showing a state after the test to examine the heat spot resistance is conducted.
Figure 2B:
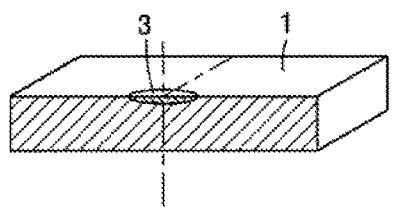
FIG. 2B is a sectional view taken along A-A of FIG. 2A showing the state after the test to examine the heat spot resistance is conducted.
Figure 2C:
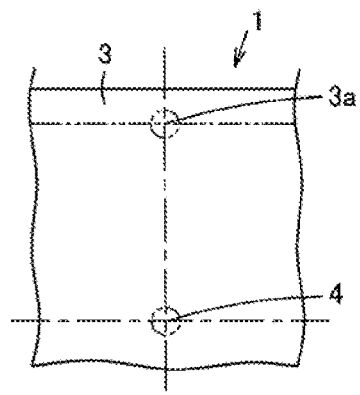
FIG. 2C shows a site where hardness is measured.

As shown in FIGS. 2A to 2C, in the cross section of the test piece 1 after the laser irradiation, Vickers hardness was measured at a laser irradiated measuring site 3a in a position distanced by 100 μm from a surface of a laser-irradiated part 3 irradiated with the laser and at a thickness central part 4 corresponding to a central part of a thickness direction. Then, a degree of hardening or softening of the front layer (laser irradiated measuring site 3a) relative to internal hardness (at the thickness central part 4) was evaluated. In Table 2, a test piece 1 generating a difference of ±50 HV or less between the hardness at the front layer and the internal hardness was evaluated as being good and is identified with o, a test piece 1 generating a difference exceeding 50 HV but below 100 HV is identified with Δ, a test piece 1 generating a difference of 100 HV or more is identified with ΔΔ, and a test piece 1 generating a difference below −50 HV is identified with ▼.

The test pieces were evaluated comprehensively. A test piece evaluated as being good in all the following evaluations was determined to having passed the tests and is identified with o in Table 2: the ratio of a hard structure, evaluation of the nature of a punching surface through the punching test, evaluation of antifriction and antiwear performance through the pin-on-disk friction and wear test, and evaluation of heat spot resistance through the heat spot resistance test.

Respective conditions for the tests and test results are shown in Table 2.

TABLE 2

| Test No. | Classification | Hot Rolling Condition | Average Coding speed | Annealing | Cold Rolling | Hardness of Cross Section (HY) | Average Particle Diameter of Carbide in Fixed Layer Part (μm) | Ratio of Hard Structures | Punching Test | Fatigue Test | Heat Comprehensive | Rapid Heatings Rapid Cooling Test | Comprehensive Evaluation | SAE-No. 2 Test |
|---|---|---|---|---|---|---|---|---|---|---|---|---|---|---|
| 1 | Comparative Example | 1250° C. heating to 570° C. winding | 33° C./sec. | No | Yes | 254 | A | ○ | ○ | ▲ | ○ | × | × | |
| 2 | Comparative Example | 1250° C. heating to 570° C. winding | 93° C./sec. | No | Yes | 265 | B | × | ○× | ○ | × | ▲▲ | × | |
| 3 | Comparative Example | 1250° C. heating to 570° C. winding | 28° C./sec. | No | Yes | 256 | B | × | × | ▲ | ○ | ▲ | × | |
| 4 | Comparative Example | 1250° C. heating to 570° C. winding | 28° C./sec. | No | Yes | 363 | B | × | ▲× | ▲ | ○ | ○ | × | |
| 5 | Comparative Example | 1250° C. heating to 570° C. winding | 30° C./sec. | No | Yes | 258 | B | ○ | ○ | ○ | ○ | × | × | |
| 6 | Comparative Example | 1250° C. heating to 570° C. winding | 29° C./sec. | No | Yes | 377 | C | ○ | ○× | ▲ | ○ | ○ | × | |
| 7 | Comparative Example | 1250° C. heating to 570° C. winding | 32° C./sec. | No | Yes | 347 | B | ○ | ○× | ▲ | ○ | ▲ | × | |
| 8 | Comparative Example | 1250° C. heating to 570° C. winding | 33° C./sec. | No | Yes | 246 | B | ○ | ▲ | ▲ | ○ | ▲▲ | × | × |
| 9 | Comparative Example | 1250° C. heating to 600° C. winding | 39° C./sec. | No | Yes | 254 | B | ○ | ▲ | × | × | ○ | × | × |
| 10 | Comparative Example | 1250° C. heating to 600° C. winding | 33° C./sec. | No | Yes | 262 | B | ○ | ○ | ○ | × | ▲ | × | |
| 11-a | Working Example | 1250° C. heating to 570° C. winding | 33° C./sec. | No | Yes | 199 | B | × | × | × | ○ | ○ | ○ | |
| 11-b | Comparative Example | 1250° C. heating to 570° C. winding | 33° C./sec. | No | Yes | 265 | B | ○ | ○ | ○ | ○ | × | × | |
| 11-c | Comparative Example | 1250° C. heating to 730° C. winding | 30° C./sec. | No | Yes | 262 | A | × | × | ▲ | ○ | ▲ | × | × |
| 11-d | Comparative Example | 1100° C. heating to 570° C. winding | 32° C./sec. | No | Yes | 262 | A | × | × | × | ○ | × | × | ○ |
| 12-a | Comparative Example | 1250° C. heating to 570° C. winding | 32° C./sec. | No | Yes | 206 | B | × | ×* | ▲ | ○ | × | × | |
| 12-b | Comparative Example | 1250° C. heating to 570° C. winding | 25° C./sec. | 690° C.-20 h | No | 431 | A | × | *△ | * | ○ | ○ | × | × |
| 12-c | Comparative Example | 1250° C. heating to 650° C. winding | 30° C./sec. | No | Yes | 252 | B | ○ | ○ | ○ | ○ | ○ | ○ | ○ |
| 13-a | Working Example | 1250° C. heating to 650° C. winding | 27° C./sec. | No | Yes | 272 | B | ○ | ▲ | ○ | ○ | ▶ | × | |
| 13-b | Working Example | 1250° C. heating to 570° C. winding | 30° C./sec. | 690° C.-26 h | Yes | 261 | B | × | ○ | ○ | ○ | ○ | × | |
| 13-c | Comparative Example | 1250° C. heating to 450° C. winding | 32° C./sec. | No | Yes | 256 | B | ○ | ○ | ○ | ○ | ○ | ○ | |
| 14 | Working Example | 1250° C. heating to 450° C. winding | 30° C./sec. | No | Yes | 248 | B | ○ | ○ | ○ | ○ | × | × | |
| 15 | Working Example | 1250° C. heating to 450° C. winding | 32° C./sec. | No | Yes | 259 | B | ○ | ○ | ▲ | ○ | ○ | ○ | |
| 16 | Working Example | 1250° C. heating to 450° C. winding | 29° C./sec. | No | Yes | 255 | B | ○ | ○ | × | ○ | ○ | ○ | |
| 17 | Working Example | 1250° C. heating to 450° C. winding | 32° C./sec. | No | Yes | 260 | B | ○ | ○ | ▲ | ○ | ○ | ○ | |
| 18 | Working Example | 1250° C. heating to 450° C. winding | 27° C./sec. | No | Yes | 247 | B | ○ | ○ | ▲ | ○ | × | × | |
| 19 | Working Example | 1250° C. heating to 650° C. winding | 26° C./sec. | No | Yes | 266 | B | ○ | × | ○ | ○ | ○ | ○ | |
| 20 | Comparative Example | 1250° C. heating to 600° C. winding | 25° C./sec. | No | Yes | 263 | B | × | ○ | ▲ | ○ | ○ | × | |
| 21 | Working Example | 1250° C. heating to 600° C. winding | 28° C./sec. | No | Yes | 261 | B | ○ | ○ | ○ | ○ | ○ | ○ | |
| 22 | Working Example | 1250° C. heating to 600° C. winding | 33° C./sec. | No | Yes | 258 | B | ○ | ○ | ○ | ○ | ○ | ○ | |
| 23 | Working Example | 1250° C. heating to 600° C. winding | 31° C./sec. | No | Yes | 246 | B | ○ | ▲ | ○ | ○ | ○ | ○ | |
| 24 | Working Example | 1250° C. heating to 600° C. winding | 28° C./sec. | No | Yes | 238 | B | ○ | ○ | ○ | ○ | ○ | ○ | |
| 25 | Working Example | 1250° C. heating to 600° C. winding | 32° C./sec. | No | Yes | 282 | B | ○ | ○ | ○ | ○ | ○ | ○ | ○ |
| 26 | Working Example | 1250° C. heating to 630° C. winding | 27° C./sec. | No | Yes | 234 | B | ○ | ○ | ○ | ○ | ○ | ○ | |
| 27 | Working Example | 1250° C. heating to 630° C. winding | 25° C./sec. | No | Yes | 278 | B | ○ | ○ | ▲ | ○ | ○ | ○ | |
| 28 | Working Example | 1250° C. heating to 630° C. winding | 32° C./sec. | No | Yes | 297 | B | ○ | ○ | ▲ | ○ | ○ | ○ | |
| 29 | Working Example | 1250° C. heating to 630° C. winding | 30° C./sec. | No | Yes | 323 | B | ○ | ○ | ▲ | ○ | ○ | ○ | |
| 30 | Working Example | 1250° C. heating to 630° C. winding | 25° C./sec. | No | Yes | 292 | B | ○ | ○ | ○ | ○ | ○ | ○ | ○ |
| 31 | Working Example | 1250° C. heating to 600° C. winding | 23° C./sec. | No | Yes | 262 | B | ○ | ○ | ○ | ○ | ○ | ○ | |
| 32 | Working Example | 1250° C. heating to 600° C. winding | 24° C./sec. | No | Yes | 269 | B | × | × | ▲ | ○ | ○ | × | |
| 33 | Working Example | 1250° C. heating to 600° C. winding | 23° C./sec. | No | Yes | 258 | B | ○ | ▲ | ○ | ○ | × | × | |
| 34 | Comparative Example | 1250° C. heating to 520° C. winding | 25° C./sec. | 600° C.-20 h | Yes | 258 | B | × | ○ | ▲ | ○ | ○ | × | |
| 35 | Comparative Example | 1250° C. heating to 520° C. winding | 35° C./sec. | 690° C.-20 h | Yes | 262 | B | ○ | ○ | ○ | ○ | ○ | ○ | ○ |
| 36 | Comparative Example | 1250° C. heating to 600° C. winding | 28° C./sec. | No | Yes | 258 | B | ○ | ○ | ○ | ○ | ○ | ○ | |
| 37 | Working Example | 1250° C. heating to 600° C. winding | 31° C./sec. | No | Yes | 262 | B | ○ | ○ | ○ | ○ | ○ | ○ | |

As shown in Table 2, all Working Examples achieved favorable results in terms of punching performance, antifriction and antiwear performance, and heat spot resistance.

Regarding test No. 1 corresponding to a Comparative Example, Nb and V were not added while a small quantity of Ti was added, so that substantially no fine carbide was precipitated. This is considered to be a cause for reduction in antiwear performance, thereby softening a surface during the rapid heating and rapid cooling test.

Regarding test No. 2 corresponding to a Comparative Example, adding C to a content larger than 0.08% is considered to be a cause for increase in a hard structure, thereby degrading the nature of a punching surface. This large content of C is also considered be a cause for martensitic transformation occurring in a rapidly cooled part during the rapid heating and rapid cooling test, thereby hardening a surface to cause bad heat spot resistance while reducing heat conductivity.

Regarding test No. 3 corresponding to a Comparative Example, adding C to a content larger than 0.08% is considered to be a cause for increase in a hard structure, thereby degrading the nature of a punching surface. Further, the Q value larger than 1 is considered be a cause for martensitic transformation occurring in a rapidly cooled part during the rapid heating and rapid cooling test, thereby hardening a surface to reduce heat spot resistance.

Regarding test No. 5 corresponding to a Comparative Example, adding C to a content larger than 0.08% is considered to be a cause for increase in a hard structure. Further, adding Si to a content larger than 1.0% is considered to be a cause for reduction in processability, thereby degrading the nature of a punching surface.

Regarding test No. 6 corresponding to Comparative Example, adding C to a content smaller than 0.03% is considered to be a cause for a small quantity of a precipitated carbide or cementite, thereby reducing antiwear performance and softening a surface during the rapid heating and rapid cooling test.

Regarding test No. 7 corresponding to a Comparative Example, adding Ti to a content larger than 0.3% is considered to be a cause for hardening of a material, thereby degrading the nature of a punching surface.

Regarding test No. 8 corresponding to a Comparative Example, the value larger than 0.3 of the formula (2) relating to the respective contents of Ti and Nb is considered to be a cause for hardening of a material, thereby degrading the nature of a punching surface.

Regarding test No. 9 corresponding to a Comparative Example, adding Mn to a content larger than 0.8% and the Q value larger than 1 are considered to be causes for degradation of the nature of a punching surface, hardening of a surface during the rapid heating and rapid cooling test, and degradation of antiwear performance.

Regarding test No. 10 corresponding to a Comparative Example, adding Mn to a content larger than 0.8% and the Q value larger than 1 are considered to be causes for degradation of the nature of a punching surface and hardening of a surface during the rapid heating and rapid cooling test. Further, adding C to a content larger than 0.08% is considered to be a cause for reduction in heat conductivity, degradation of the nature of a punching surface, and reduction in antiwear performance.

Regarding test No. 11-b corresponding to a Comparative Example, cross-sectional hardness lower than 200 HV is considered to be a cause for degradation of the nature of a punching surface (occurrence of sagging) and reduction in antiwear performance.

Regarding test No. 11-c corresponding to a Comparative Example, a winding temperature higher than 700'C is considered to be a cause for reduction in the diameter of particles of a carbide precipitated in a front layer in response to progressing of surface decarburization, thereby softening a surface during the rapid heating and rapid cooling test.

Regarding test No. 11-d corresponding to a Comparative Example, a heating temperature below 1200° C. during hot rolling is considered to be a cause for insufficient dissolving of a carbide and suppression of fine precipitation, thereby reducing a carbide precipitated in a front layer to reduce antiwear performance while softening a surface during the rapid heating and rapid cooling test.

Regarding test Nos. 12-a and 12-b corresponding to Comparative Examples, adding C to a content larger than 0.08% is considered to be a cause for increase in a hard structure, thereby degrading the nature of a punching surface while softening a surface during the rapid heating and rapid cooling test.

Regarding test No. 12-c corresponding to a Comparative Example, a winding temperature below 550° C. is considered to be a cause for coarsening of a carbide precipitated in a front layer, thereby reducing punching performance to degrade the nature of a punching surface.

Regarding test No. 13-c corresponding to a Comparative Example, a winding temperature below 550° C. is considered to be a cause for a fine carbide precipitated in a front layer and increase in a hard structure to harden a material, thereby degrading the nature of a punching surface while softening a surface during the rapid heating and rapid cooling test.

Regarding test No. 20 corresponding to a Comparative Example, adding C to a content larger than 0.08% is considered to be a cause for increase in a hard structure, thereby degrading the nature of a punching surface while reducing antiwear performance.

Regarding test Nos. 34 and 35 corresponding to Comparative Examples, adding C to a content larger than 0.08% is considered to be a cause for increase in a hard structure, thereby degrading the nature of a punching surface while reducing antiwear performance.

Regarding test No. 36 corresponding to a Comparative Example, adding S to a content larger than 0.01% is considered to be a cause for degradation of the nature of a punching surface and reduction in antiwear performance.

Regarding each of the test Nos. 11-a, 13-a, 27, and 31 corresponding to Working Examples and test Nos. 9, 10, 12-c, and 34 corresponding to Comparative Examples, a test piece was actually formed into the shape of a separator plate and was subjected to a clutch performance test with an SAE-No. 2 tester as a clutch friction tester. Then, the presence or absence of a heat spot was observed visually.

As a result, the occurrence of a heat spot was not observed in any of the Working Examples. In contrast, the occurrence of a heat spot was observed in every Comparative Example except test No. 34.

The invention claimed is:

1. A cold-rolled steel plate having a chemical composition containing, on the basis of percent by mass, C from 0.03 to 0.08%, Si from 0 to 1.0%, Mn from 0.2 to 0.8%, P at 0.03% or less, S at 0.01% or less, and Al at 0.05% or less so as to satisfy the following formula (1) and at least one of Nb from 0.03 to 0.4%, V from 0.01 to 0.3%, and Ti from 0.01 to 0.3% so as to satisfy the following formula (2), with a residue being formed of Fe and unavoidable impurities, wherein an average diameter of particles of a carbide as a precipitate containing any of Nb, V, and Ti is from 20 nm to 100 nm, a second phase structure having a longitudinal diameter of 5 μm or more has an area fraction of 5% or less and above 0% in a cross-sectional structure, and the cold-rolled steel plate has cross-sectional hardness from 200 to 350 HV, $$5*C\ \%-Si\ \%+Mn\ \%-1.5*Al\ \%<1; \text{ and} \quad \text{formula (1)}$$

$$0.04<(Nb\ \%/1.4)+(V\ \%/1.1)+Ti\ \%<0.3. \quad \text{formula (2)}$$

2. The cold-rolled steel plate according to claim 1, wherein the chemical composition contains, on the basis of percent by mass, at least one of Cr from 0.10 to 2.0%, Ni from 0.05 to 0.5%, Mo from 0.05 to 0.5%, and B from 0.0002 to 0.002% so as to satisfy a $$5*C\ \%+Mn\ \%+1.6*Cr\ \%+0.8*Ni\ \%-1.5*Al\ \%<1. \quad \text{formula (3)}$$

3. The cold-rolled steel plate according to claim 1, wherein the average diameter of particles of the carbide containing any of Nb, V, and Ti is from 20 nm to 100 nm, the carbide being a precipitate in a front layer part extending at least 200 μm from a surface of the steel plate.

4. A method of manufacturing a cold-rolled steel plate, wherein a steel slab having the chemical composition as recited in claim 1 is smelted, the steel slab is heated to 1200° C. or more and hot rolled to form a hot-rolled steel plate, the hot-rolled steel plate is wound from 550 to 700° C. to form a hot-rolled coil, and the hot-rolled coil is cold rolled or the hot-rolled coil is annealed and cold rolled, thereby obtaining cross-sectional hardness from 200 to 350 HV.

5. The cold-rolled steel plate according to claim 2, wherein the average diameter of particles of the carbide containing any of Nb, V, and Ti is from 20 nm to 100 nm, the carbide being a precipitate in a front layer part extending at least 200 μm from a surface of the steel plate.

6. A method of manufacturing a cold-rolled steel plate, wherein a steel slab having the chemical composition as recited in claim 2 is smelted, the steel slab is heated to 1200° C. or more and hot rolled to form a hot-rolled steel plate, the hot-rolled steel plate is wound from 550 to 700° C. to form a hot-rolled coil, and the hot-rolled coil is cold rolled or the hot-rolled coil is annealed and cold rolled, thereby obtaining cross-sectional hardness from 200 to 350 HV.

7. The cold-rolled steel plate according to claim 1, wherein the second phase structure having a longitudinal diameter of 5 μm or more has an area fraction of greater than 0%.

* * * * *